Patented Mar. 21, 1939

2,151,412

UNITED STATES PATENT OFFICE 2,151,412

PROCESS FOR THE UTILIZATION OF SAWDUST FOR THE PRODUCTION OF PLASTICS

Earl C. Sherrard, Edward Beglinger, John P. Hohf, and Raymond L. Mitchell, Madison, Wis., and Ernest Bateman, deceased, late of Madison, Wis., by William T. Bateman, Madison, Wis., special administrator, assignors to Henry A. Wallace, Secretary of Agriculture of the United States of America, and his successors in office No Drawing. Application January 28, 1938, Serial No. 187,566

1 Claim. (Cl. 260—227)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

Our invention relates to a process for the treatment of wood waste, preferably in the form of finely ground sawdust, or wood flour, for the purpose of producing an esterified product, having molding properties similar to the more highly refined cellulose esters, but offering a cheaper product for use where the clear, colorless properties of the more highly refined cellulose ester are not required.

In our process we prefer to give the sawdust a pretreatment which adds to the ease of esterification, and to the uniformity of the final product.

The acetylation of cellulose for the production of transparent, translucent, and/or colored objects such as films, molded products, etc., is a well-known art. Other investigators [Hermann Suida and Herbert Titsch, Berichte 61B:1599–1604 (1928); Otto Horn, Berichte 61B:2542–5 (1928); Walter Fuchs, Berichte 61:948–51 (1928); E. E. Harris, E. C. Sherrard, and R. L. Mitchell, Jour. Amer. Chem. Soc. 56:889 (1934); I. G. Farbenind. A. G., British Pat. 336,969 (1929); Hermann Suida, Austrian Pat. 122,499 (1930)], have acetylated sawdust and/or wood flour primarily for the purpose of the study of the chemical nature of wood substance, in which studies the wood is treated to produce the highest acetyl content of the wood; in most cases the temperature of the reaction and catalyst concentration is so high as to produce a material unsuited to production of plastics. To our knowledge, no one has applied a controlled acetylation to wood substance for the production of a material suitable for plastics, but we find that if the acetylation of a wood substance, such as wood flour, is carefully controlled, as in the acetylation of highly refined cellulose, a product is obtained having excellent moldability as a plastic, the plastic product having fine physical characteristics is semitranslucent, and is light to dark brown in color.

Our pretreatment consists of treating the sawdust with acetic acid, for the purpose primarily of thoroughly swelling the wood fibers, before addition of the acetylating mixture. This can be accomplished by heating the sawdust, in sufficient acetic acid to permit easy stirring, for, say, 6 to 8 hours, cooling, and adding the acetyating mixture. It can also be accomplished by cooling the sawdust and acetic acid to 0° to 5° C. until the acid has completely solidified—the crystals of acid forming in the sawdust seeming to have a similar disrupting effect on the wood fibers; or the pretreatment may consist of a combination of these two methods, heating until thoroughly swelled, then frozen. We prefer this last method of pretreatment.

If the sawdust-acid mixture has been frozen, the acetylating mixture is gradually added to the frozen mass, with continual stirring or agitation, care being taken to prevent any rapid temperature rise. We prefer to keep the temperature from rising above 10° to 15° C. until after the exothermic reaction has ceased, after which time the temperature is brought very gradually to a temperature of 30° to 40° C. until the completion of the acetylation.

Our invention will be better understood from the following typical example:

To 50 parts of sawdust are added about 450 parts of glacial acetic acid, in a vessel equipped with a mechanical stirrer. This mixture is then heated to about 100° C. for, say, 6 to 8 hours, or until the wood fibers have become thoroughly swelled; the mixture is then cooled to 0° to 5° C. until the glacial acetic acid has completely crystallized. The acetylating mixture, which has previously been prepared, consisting of 250 parts of acetic anhydride and 1.5 to 3 parts of a mineral acid catalyst, for example 1.5 parts sulphuric acid and 1.5 parts phosphoric acid, is then gradually added to the acetic acid-sawdust mixture, with continuous stirring, cooling being maintained to prevent the temperature from rising above 15° C. for a period of 3 to 4 hours, or until there is no more danger of a spontaneous temperature rise due to the exothermic reaction.

After this period of treatment, the temperature is allowed is rise, with the addition of heat if necessary, over a period of, say, 2 hours until a temperature of 30° to 40° C. has been reached, which is maintained for 3 or 4 hours, or until tests show that the reaction is complete.

At this point, the wood acetate may be separated from the acetylating mixture by pouring into an excess of ice water, filtered and washed, or, as we prefer, washed free of the acetylating mixture, by an excess of benzene, followed by methyl alcohol and by ether.

After drying, the product is ready for molding, with or without the addition of plasticizers. The molding properties vary with the acetyl content and, to a lesser extent, on the species of wood used. As examples, we have found that acetylated maple, with an acetyl content of 35.2 percent pressed excellently, without plasticizers, at 150° C., 3,000 pounds per square inch, whereas a sample of acetylated white spruce with a similar acetyl content (37 percent), unplasticized, required a molding temperature of 190° C. to give a product comparable to the maple. Lower acetyl contents (28 percent) molded quite well at 150° C., but did not have the semitranslucent appearance of those of higher acetyl content, nor did they have as high water resistance.

Having thus described our invention, what we claim for Letters Patent is:

A method for the preparation of a material suitable for molding, which consists in subjecting substantially 50 parts of dry sawdust to the action of about 450 parts glacial acetic acid and a temperature of about 100° C., the while stirring the mixture for from 6 to 8 hours, thence subjecting the mixture to the action of a temperature ranging from 0° to 5° C., thence adding 250 parts acetic anhydride to which has been added from 1½ to 3 parts of a mineral acid catalyst, maintaining the temperature at 10° to 15° C. for about 3 hours, thence raising the temperature slowly to 30° to 40° C. at which temperature it is maintained 3 to 4 hours, thence washing the mixture free of acids, and thence drying the acetylated wood to a moisture content suitable for molding.

EARL C. SHERRARD.
EDWARD BEGLINGER.
JOHN P. HOHF.
RAYMOND L. MITCHELL.
WILLIAM T. BATEMAN,
*Special administrator of Ernest Bateman, Deceased.*